April 1, 1930.  B. H. URSCHEL  1,753,037

AXLE FOR SELF PROPELLED VEHICLES

Filed March 7, 1928

Inventor
Bertis H. Urschel
By Faust F. Crampton
Attorney

Patented Apr. 1, 1930

1,753,037

UNITED STATES PATENT OFFICE

BERTIS F. URSCHEL, OF BOWLING GREEN, OHIO, ASSIGNOR TO URSCHEL ENGINEERING COMPANY, OF BOWLING GREEN, OHIO, A CORPORATION OF OHIO

AXLE FOR SELF-PROPELLED VEHICLES

Application filed March 7, 1928. Serial No. 259,799.

My invention has for its object to provide a light weight and exceedingly strong durable axle. The invention particularly has for its object to provide an axle formed of steel tubing and having parts thereof so constructed and shaped that the axle will withstand the stresses and strains to which it may be subjected and will, by reason of its tubular form, be lighter in weight than the ordinary solid axle commonly used in connection with self-propelled vehicles. The invention further provides a particular construction for connecting a tubular axle with the stub axles of the guiding wheels of the vehicle, such as the front wheels of the ordinary automobile or self-propelled truck.

The invention also has for its object other features and advantages that render such axles applicable to the needs of the present day automobile and truck that will appear from the following description and upon examination of the drawings.

The invention may be contained in axle structures that vary in their form and, to illustrate a practical application of the invention, I have selected an axle containing the invention as an example of the various constructions that embody the invention and shall describe it hereinafter. The axle selected is shown in the accompanying drawing.

Figure 1:
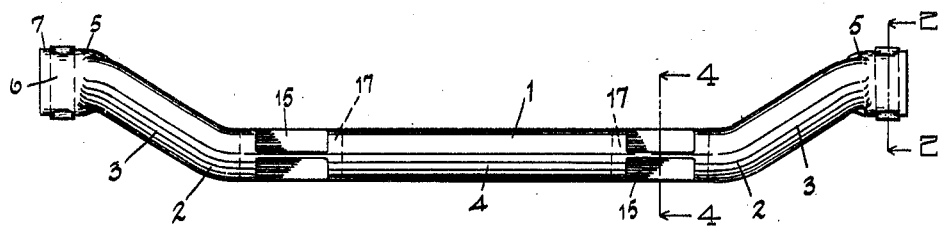
Figure 2:
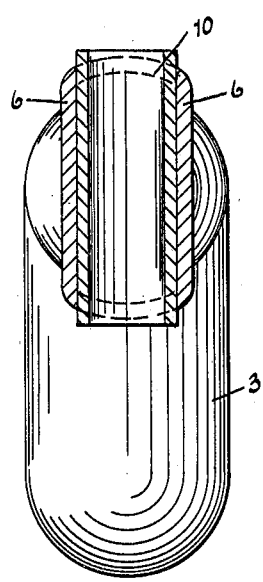
Figure 4:
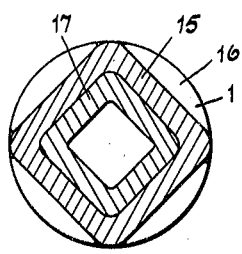
Figure 3:
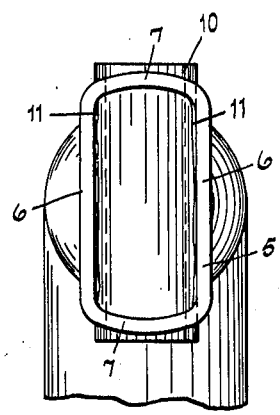

Fig. 1 is a side view of the axle. Fig. 2 is a view of a section taken on the plane of the line 2—2 indicated in Fig. 1. Fig. 3 is an end view of a part of the axle. Fig. 4 is a view of a section taken on the plane of the line 4—4 indicated in Fig. 1.

The end portions of the tubular axle may be bent as may be desired in order to support or hang the vehicle in any desired position with reference to the centers of the wheels. In the form of construction shown in the figures, the axle 1 is bent at two points such as at 2, to incline portions 3 of the axle upward from the central portion 4. Inasmuch as the guiding wheels of the vehicle are swivelled about axes that are located substantially vertical, that is, substantially at right angles to the axis of the central or body portion 4 of the axle, the ends 5 of the axle are bent so as to extend substantially parallel to the body or central portion 4 of the axle and suitable provision is made for supporting the stub axles of the guiding wheels of the vehicle in the ends 5 of the tubular axle.

In order that a bearing connection may be made between a tubular axle and the stub axles of the guiding wheels of the vehicle that will withstand the heavy stress and strains that the tubular axle will be subjected to, at these points, I have provided a special knuckle construction. The ends 5 of the tubular axle are flattened as shown in Figs. 2 and 3 at opposite sides to form a pair of parallel sustaining walls 6 and top and bottom walls 7. The top and bottom walls are bored to form holes extending through the walls that have diameters substantially the same as the distance between the flattened walls 6. Bearing members are inserted in the ends 5 of the tubular axle and so as to fit the holes and between the walls.

The bearing members may partake of different forms. In each case, its structure or form will depend upon the form of bracket to which the stub axles are connected or formed integral with. In the form of construction shown in the drawings, a tube 10 is inserted in the ends 5 of the tubular axle and preferably protrudes slightly beyond the surfaces of the top and bottom walls 7 so as to locate its end surfaces on the outside of the tubular axle. The end surfaces may be cut substantially at right angles to the axes of the tubes 10 and form shoulders or supporting bearings or parts for supporting the axle together with that portion of the vehicle that is supported by the axle. In order to rigidly secure the tubes 10 within the end parts 5 of the axle the tube is welded along the portions 11 of its cylindrical surface that is in contact with and in close proximity to the side walls 6 of the axle. Preferably, the ends 5 of the axle are made substantially oblong and rectangular in form, and their height is preferably considerably greater than their width, in order to form an efficient sustaining area between the tubes 10 and the ends of the axle. The curved top sides 7 of the end portions of the axle provides a structural form that most efficiently resists the downward pressure of the yokes of the stub axles when connected to the ends of the tubular axle, and the curved bottom sides 7 also provide a structure that will support the load placed upon the tubular axle, that is, the arcuate walls of the end portions of the axle will most efficiently support the weight of the load placed upon the tubular axle.

I claim:

1. An axle for a vehicle comprising a tubular member having oblong end portions, the major axis of the end portions extending substantially vertically, the top and bottom sides of the end portions being cylindrical in form and the sides of the end portions being substantially plane, the top and bottom having holes and bearing members fitting the said holes and the inner surfaces of the said sides of the end portions.

2. An axle for a vehicle comprising a tubular member having end portions oblong in form, two of the sides of the end portions being arcuate in form and having openings formed therethrough, bearing members extending through the openings and fitting between the remaining sides of the end portions.

In witness whereof I have hereunto signed my name to this specification.

BERTIS H. URSCHEL.